United States Patent
Nguyen et al.

(10) Patent No.: US 10,177,596 B2
(45) Date of Patent: Jan. 8, 2019

(54) BACKUP POWER MANAGER

(71) Applicant: Hewlett Packard Enterprise Development LP, Houston, TX (US)

(72) Inventors: Hai Ngoc Nguyen, Spring, TX (US); Abhishek Banerjee, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 315 days.

(21) Appl. No.: 15/205,965

(22) Filed: Jul. 8, 2016

(65) Prior Publication Data
US 2018/0013318 A1    Jan. 11, 2018

(51) Int. Cl.
*H02J 7/00* (2006.01)
*H02J 9/06* (2006.01)

(52) U.S. Cl.
CPC ............ *H02J 9/061* (2013.01); *H02J 7/0024* (2013.01)

(58) Field of Classification Search
CPC ...................................................... H02J 9/061
See application file for complete search history.

(56) References Cited

U.S. PATENT DOCUMENTS

| | | | |
|---|---|---|---|
| 5,422,558 A | 6/1995 | Stewart | |
| 6,184,656 B1 | 2/2001 | Karunasiri et al. | |
| 6,329,792 B1 | 12/2001 | Dunn et al. | |
| 7,725,182 B2 | 5/2010 | Sutardja | |
| 2004/0201931 A1* | 10/2004 | Korcharz | H02J 1/10 361/18 |
| 2008/0174278 A1* | 7/2008 | Masias | H02J 1/10 320/138 |
| 2015/0115898 A1* | 4/2015 | Yung | H02J 7/0021 320/152 |

OTHER PUBLICATIONS

Novel Controller Selectively Charges Individual Cells in a Battery Pack, (Research Paper), Dec. 20, 2013, 2 Pages.

* cited by examiner

*Primary Examiner* — Jared Fureman
*Assistant Examiner* — Duc M Pham
(74) *Attorney, Agent, or Firm* — Hewlett Packard Enterprise Patent Department

(57) ABSTRACT

Examples disclosed herein involve backup power management. In an example, an amount of backup power to power a load bank is estimated, a set of power sources are selected from a plurality of power sources based on respective states of charge of the plurality of power sources and the estimated amount of backup power, and the selected set of power sources are placed in circuit to provide backup power to the load bank via the selected set of power sources.

13 Claims, 6 Drawing Sheets

BACKUP POWER MANAGER

BACKGROUND

An uninterrupted power source (UPS) includes a power controller and battery packs (or any other suitable power source) to provide power to electronic components. Data centers may employ UPSs to provide backup power to a load bank of the data center (e.g., components of the datacenter, such as computers, servers, network devices, etc.), Accordingly, in the event of a power failure, a UPS may discharge its power sources to ensure that the load bank of the datacenter continues to receive power, thus preserving the integrity of the datacenter.

BRIEF DESCRIPTION OF THE DRAWINGS

Wherever possible, the same reference numbers will be used throughout the drawing(s) and accompanying written description to refer to the same or like parts.

DETAILED DESCRIPTION

Examples disclosed herein involve managing backup power to a load bank. In examples herein, power sources are selected from a set of available power sources to provide backup power to the load bank. The example power sources may be selected based on a state of charge of the power sources and the estimated amount of power needed to provide backup power to the load bank.

In many instances, in the event of a power failure, all backup power sources (e.g., uninterrupted power sources (UPS), or battery packs of UPSs) available to provide backup power are placed in circuit to provide backup power. Thus, regardless of whether or not the available backup power sources are needed, they are discharged to provide backup power. Discharging power sources reduces the useful life of the power sources. In examples herein, power sources are selectively discharged based on an amount of power needed to provide backup power and the strength (e.g., states of charge (SOC) of the power sources themselves). Therefore, power sources that are not needed in circuit to provide backup power may not be used, which reduces unnecessary charge/discharge and extends the useful life of the power sources. For example, stronger power sources (e.g., based on amount of remaining power, percentage of remaining power of the respective power units or battery packs, etc.) may be selected first for discharge to provide the longest runtime and allow a subset of the available power sources to provide the backup power. Additionally, selective charging may be employed, which can reduce charge time. Accordingly, examples herein efficiently provide sufficient backup power to a load bank while increasing life span of power sources and runtime for providing backup power, which further reduces costs (e.g., maintenance, replacement, etc.) of the power sources.

An example method includes estimating an amount of backup power to power a load bank, selecting a set of power sources from a plurality of power sources to power the load bank based on respective states of charge of the plurality of power sources and the estimated amount of backup power, and placing the selected set of power sources in circuit to provide backup power to the load bank via the selected set of power sources.

Figure 1:
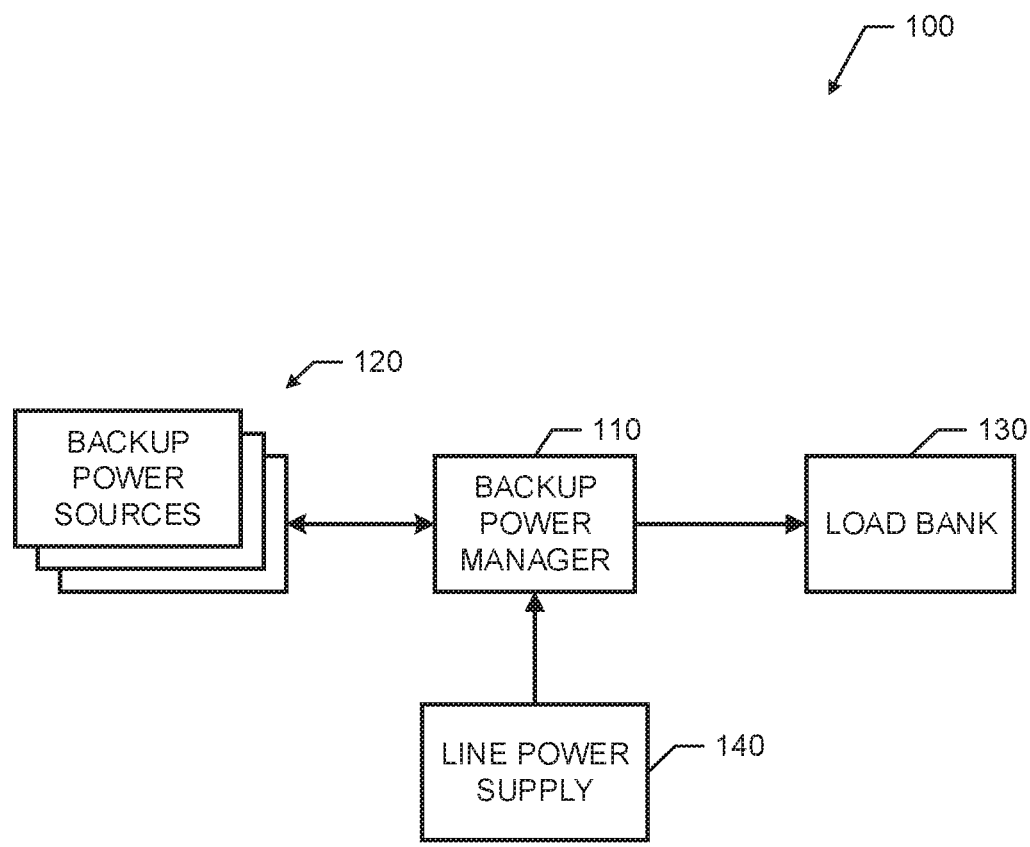
FIG. 1 illustrates a schematic diagram of an example power system including a backup power manager that may be implemented in accordance with an aspect of this disclosure.

FIG. 1 is a schematic diagram of an example power system 100 that includes an example backup power manager 110 constructed in accordance with the teachings of this disclosure. The example power system 100 of FIG. 1 includes the backup power manager 110, backup power sources 120, a load bank 130, and a line power supply 140. In examples herein, the backup power manager 110 manages charge and discharge of the backup power sources 120 to power the load bank 130 when the line power supply 140 is disconnected or unable to power the load bank 130. The backup power manager 120 monitors characteristics of the backup power sources 120 to select the backup sources 120 to be charged or discharged based on the characteristics of the backup power sources 120 or the load bank 130 in the event of a power failure in the line power supply 140. For example, the power system 100 may be implemented in a data center in which the load bank 130 may include a plurality of components (e.g., servers, computers, network equipment, etc.) that are to receive uninterrupted power from the backup power sources 120 or the line power supply 140 via the backup power manager 110.

The example backup power sources 120 may be implemented by a plurality of uninterruptible power supplies (UPSs), batteries, etc. For example, the backup power sources 120 may include power control circuitry that controls the charge and discharge of battery cells. In some examples, the backup power sources 120 may be implemented by battery packs and the backup power manager 110 may be implemented within an uninterruptible power supply (e.g., see FIG. 3 and associated description below). The example backup power sources 120 may communicate or indicate statuses of the power sources to the backup power manager 110. For example, the backup power sources 120 may indicate a state of charge (SOC) (e.g., a level of available power, percentage of available power remaining, etc.) corresponding to the backup power sources 120 or SOCs of battery cells of the respective backup power sources 120. Furthermore, the backup power sources 120 may provide discharge history indicating when the backup power sources 120 have been discharged (e.g., such as a most recent discharge time).

The example load bank 130 of FIG. 1 includes a load or plurality of loads (e.g., computers, servers, computer components, etc.). The example load bank 130 receives power from the line power supply 140 or the backup power sources 120. In examples herein, the backup power manager 110 may determine an amount of power drawn by the load bank 130 by monitoring the power supplied by the line power supply 140 or the backup power sources 120. In some examples, the backup power manager 110 may receive power information from the load bank 130. For example, units of the load bank 130 (e.g., computers, servers, etc.) may indicate when a power draw or (a spike in power draw) is expected to occur.

The example line power supply 140 may be implemented by any line power source from a source power grid (e.g., a system of power producers). In examples herein, the line power supply 140 may be disabled or disconnected (e.g., due to power failure, error, system failure, etc.) such that the line power supply 140 is unable to provide power to the load bank 130. In such examples, the backup power manager 110 may detect that the line power supply 140 is unable to provide power to the load bank 130 and determine an appropriate allocation of power from the backup power sources 120 in accordance with the examples herein.

Accordingly, the backup power manager 110 may facilitate providing backup power to the load bank 130 via power from the backup power sources 120 in accordance with examples herein. In some examples, the power system 100 and/or the backup power manager 110 may include a power converter to convert energy from the backup power sources 120 to an appropriate form (e.g., from direct current (DC) to alternating current (AC)) to power the load bank 130. Any suitable power converter may be implemented within the backup power manager 110 and/or in conjunction with the backup power manager 110.

Figure 2:
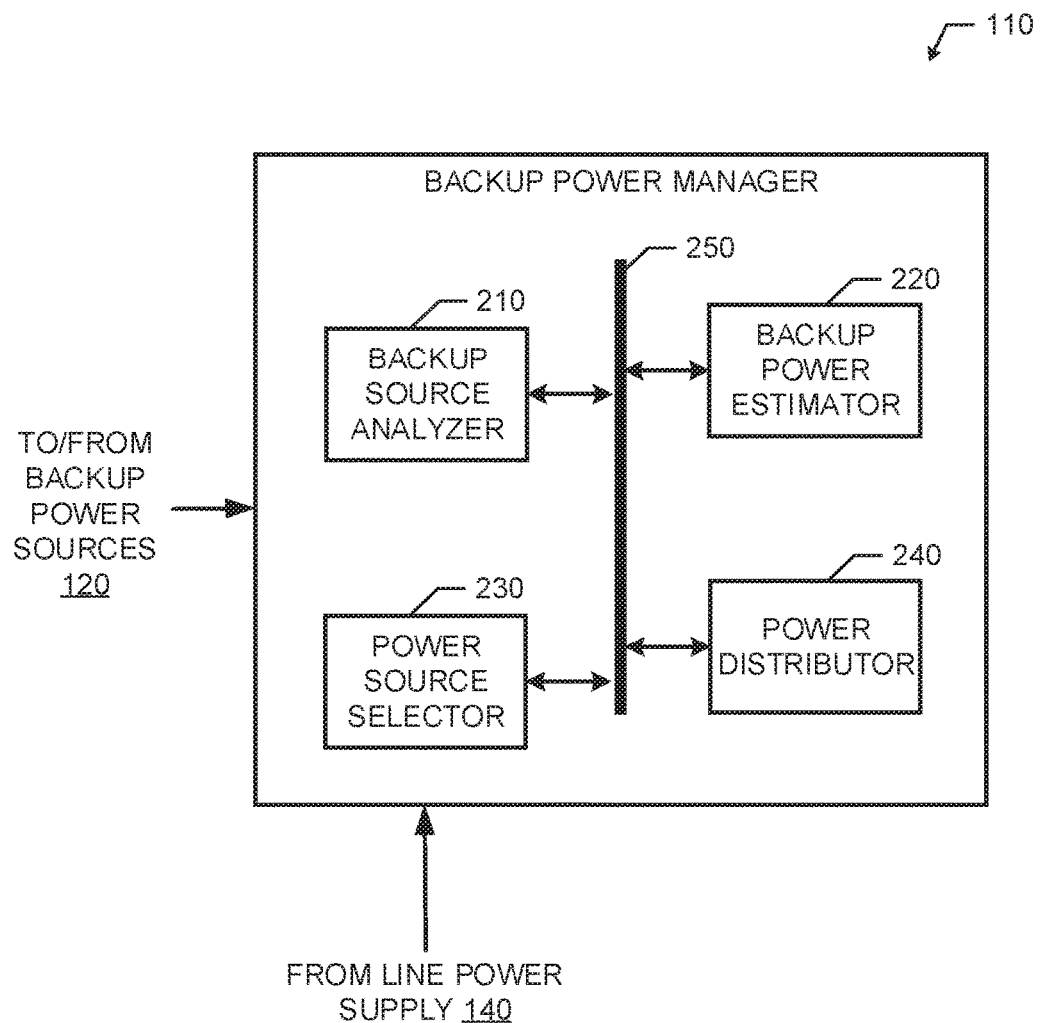
FIG. 2 is a block diagram of an example backup power manager that may be used to implement the backup power manager of FIG. 1.

FIG. 2 is a block diagram of an example backup power manager 110 that may be used to implement the backup power manager 110 of FIG. 1. The example backup power manager 110 of FIG. 2 includes a backup source analyzer 210, a backup power estimator 220, a power source selector 230, and a power distributor 240. In FIG. 2, the backup source analyzer 210, the backup power estimator 220, the power source selector 230, and the power distributor 240 communicate via a communication bus 250. In examples herein, the backup source analyzer 210 analyzes states of the backup power sources 120, the backup power estimator 220 determines an amount of power for powering the load bank 130, the power source selector 230 selects the backup power sources 110 to power the load bank based on the states of the backup power sources and the estimated power for the load bank 130, and the power distributor 240 distributes power from the selected backup power sources 120 to the load bank 130 (e.g., by placing (switching) the selected backup power sources 120 into a power circuit to power the load bank 130).

The example backup analyzer 210 of FIG. 2 retrieves (or receives) status information from the backup power sources 120 corresponding to a state of the backup power sources 120. For example, the status information may indicate a charge status of each of the backup power sources 120 (e.g., a charge level of battery packs of the backup power sources 120), timing information corresponding to charge/discharge states (e.g., when the most recent discharge of the backup power source 120, when the backup power source last reached full charge or has been charging, etc.), and capacity (or available power) of the backup power sources 120. In some examples, the backup source analyzer 210 may store status information of the backup power sources 120 in a database or any data structure (e.g., a table, an index, etc.).

The example backup power estimator 220 of FIG. 2 estimates or determines power requirements of the load bank 130. For example, upon detection of a power failure from the line power supply 140, the backup power estimator 220 may determine an amount of load power consumption of the load bank (e.g., power being distributed to the bad bank 130) at the time of the power failure or during a period of time before the power failure. Accordingly, the example backup power estimator 220 may store or access a power consumption history indicating past power distribution to the load bank 130. In some examples, the backup power estimator 220 may estimate a load based on a number of factors, such as time of day (or month, or year, etc.), capacity of the load bank (e.g., number of components or units whose power is managed by the backup power manager 110), location of the load bank 130 or location of components of the load bank 130. In some examples, the backup power estimator 220 may identify components of the load bank 130 that are critical to maintaining power for uninterrupted operation and components of the load bank 130 that are not critical to maintaining power for uninterrupted operation. In such examples, the backup power estimator 220 may only include the components that are critical to maintaining power for uninterrupted operation in estimating backup power to power the load bank 130 and the other remaining components may not be included in the backup power estimation. Therefore, in examples herein, the backup power estimator 220 may maintain or access a heuristics database to determine a power distribution profile for the load bank 130 to estimate an amount of backup power the load bank 130 may need from the backup power sources 120 in the event of a power failure from the line power supply 140. As such, the power estimator 220 may monitor power consumption of the load bank 130 to maintain and update the heuristics database.

The example power source selector 230 selects which of the backup power sources 120 are to be used in providing backup power to the load bank 130 in the event of a power failure from the line power supply 140. In examples herein, the power source selector 230 uses the status information received/retrieved by the backup source analyzer 210 and the estimated amount of power required by the load bank 130 from the backup power estimator 220 to select a set (i.e., at least one) of appropriate backup power sources 120 to provide backup power to the load bank 130. In some examples, the power source selector 230 may select the backup power sources 120 that have the greatest amount of charge (or power) available, Additionally or alternatively, the power source selector 230 may select the backup power sources 120 that are the least recently used backup power sources 120. Accordingly, the power source selector 230 enables the backup power manager 110 to control which backup power sources 120 to provide backup power to the load bank 130, rather than using all backup power sources 120 to provide backup power to the load bank 130 regardless of charge status.

As an example, after determining an amount of backup power needed to power the load bank 130, the power source selector 230 may identify which of the power sources 120 have the strongest SOC (e.g., using a ranked list of the SOCs from the status information). The example power source selector 230 may select a set of the top (or strongest) power sources 120 that would be able to provide (in sum) just enough power (e.g., a minimum amount of power) needed to satisfy the amount of backup power needed to the power the load bank 130. Thus, in sum, whether connected in series or parallel, the selected backup power sources 120 would provide sufficient power to power the load bank 130. In other words, not all of the power sources 120 would be used/discharged to provide backup power to the load bank 130. In some examples, the power source selector 230 may not select certain power sources 120 regardless of strength based on the most recent discharge or the discharge history of the power sources 120. For example, if a power source 120 has one of the strongest SOCs, the power selector 230 may not select that power source to provide backup power to the load bank 130 if the power source 120 was discharged within a most recent time period (e.g., within the last day, week, month, etc.) or if the power source was a most recent power source 120 (or one of a set number of most recent power sources 120 (e.g., one of the ten most recent power sources 120)) to provide power to the load bank 130 relative to the other power sources 120. A more specific example is further described in connection with FIG. 3.

In some examples, the power source selector 230 may select which backup power sources 120 are to be charged by the line power supply 140 after the backup power sources 120 have been discharged or upon restoration of the line power supply. For example, based on received status information (charge level, time of last discharge, etc.), the power source selector 230 may identify appropriate backup power sources 120 to charge. For example, the power source selector 230 may select the backup power sources that have the least amount of charge or the backup power sources 120 that have most recently been discharged. Accordingly, the power source selector 230 may give priority to certain backup power sources 120 to recharge the backup power sources 120 after discharge. Such priority settings may be adjusted (e.g., via user input from a user interface). As such, the power selector 230 may enable charging (or recharging) of the backup power sources 120.

The example power distributor 240 of FIG. 2 enables distribution of backup power from the backup power sources 120 or the line power supply 140. In the event of a failure or disconnection of the line power supply 140, the power distributor 240 may place the backup power sources 120 selected by the power source selector 230 in circuit with the load bank 130. For example, the power distributor 240 may include a switch controller or switching fabric to connect the selected backup power sources 120 to the load bank 130. Accordingly, the power distributor 240 may place the selected backup power sources 120 in circuit to power the load bank 130 using the selected backup power sources 120 (at least until the supply line power 140 is restored).

Accordingly, the backup power manager 110 of FIG. 2 may selectively charge and discharge backup power sources 120 based on status information of the backup power sources 120. In examples herein, the backup power manager 110 determines or estimates an amount of power needed to power the load bank 130 and select a set of the backup power sources 120 to adequately power the load bank 130. By selecting a set of backup power sources 120 to provide the estimated power to the load bank 130 (rather than using all backup power sources 120 to provide power to the load bank), the backup power manager 110 enables efficient use of the backup power sources 120, which may lengthen the life span of the backup power sources 120 while still providing sufficient power to the load bank 130.

While an example manner of implementing the backup power manager 110 of FIG. 1 is illustrated in FIG. 2, at least one of the elements, processes or devices illustrated in FIG. 2 may be combined, divided, re-arranged, omitted, eliminated or implemented in any other way. Further, the backup source analyzer 210, the backup power estimator 220, the power source selector 230, the power distributor 240 or, more generally, the example backup power manager 110 of FIG. 2 may be implemented by hardware or any combination of hardware and executable instructions (e.g., software or firmware). Thus, for example, any of the backup source analyzer 210, the backup power estimator 220, the power source selector 230, the power distributor 240 or, more generally, the example backup power manager 110 could be implemented by at least one of an analog or digital circuit, a logic circuit, a programmable processor, an application specific integrated circuit (ASIC), a programmable logic device (PLD) or a field programmable logic device (FPLD). When reading any of the apparatus or system claims of this patent to cover a purely software or firmware implementation, at least one of the backup source analyzer 210, the backup power estimator 220, the power source selector 230, or the power distributor 240 is/are hereby expressly defined to include a tangible machine readable storage device or storage disk such as a memory, a digital versatile disk (DVD), a compact disk (CD), a Blu-ray disk, etc. storing the executable instructions. Further still, the example backup power manager 110 of FIG. 2 may include at least one element, process, or device (e.g., a power converter) in addition to, or instead of, those illustrated in FIG. 2, or may include more than one of any or all of the illustrated elements, processes and devices.

Figure 3:
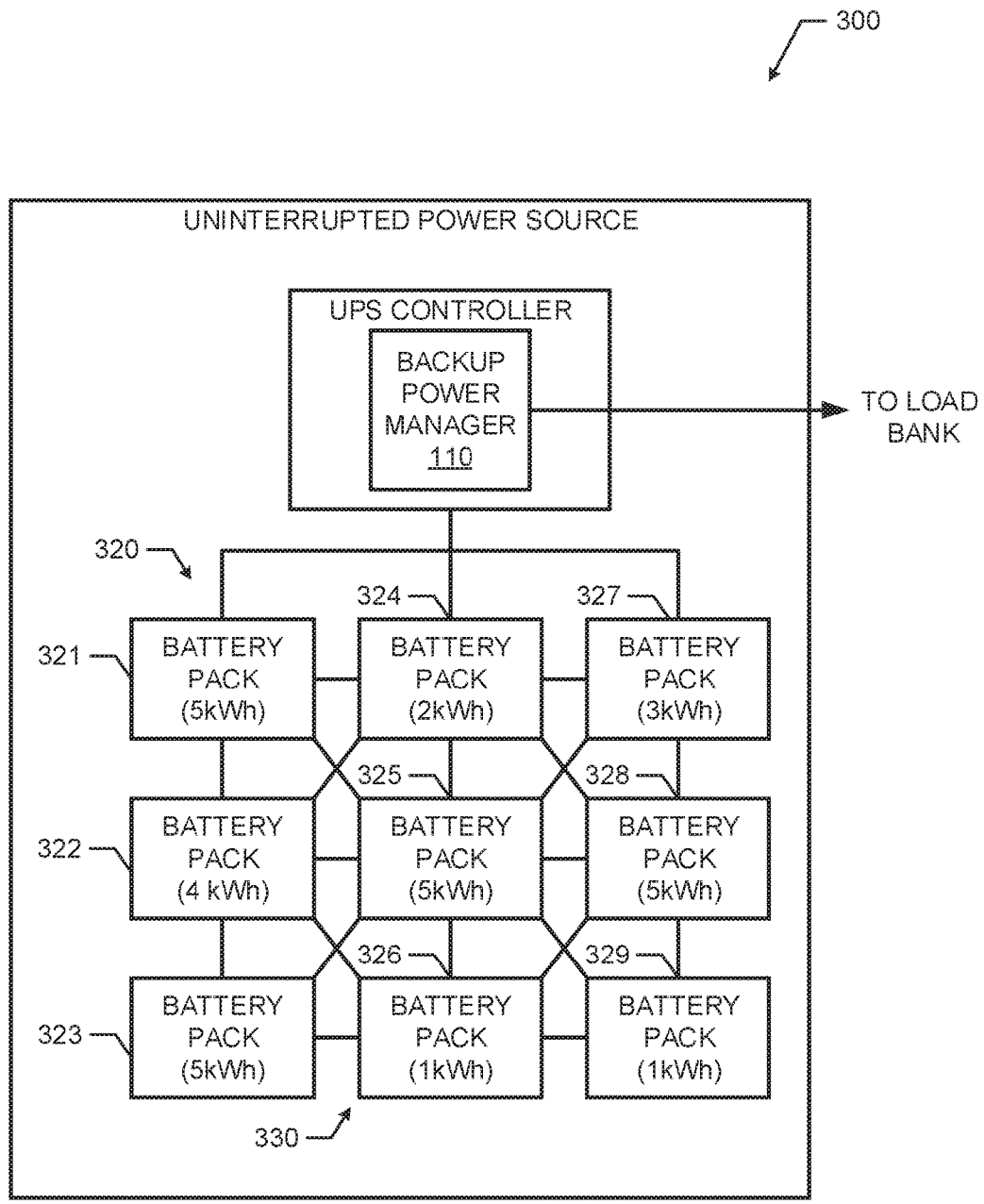
FIG. 3 illustrates an example implementation of the backup power manager within an uninterrupted power source.

FIG. 3 illustrates an example implementation of the backup power manager 110 of the power system 100 of FIG. 1 within an uninterrupted power source (UPS) 300. The example backup power manager 110 of FIG. 3 is included within a UPS controller 310 of the UPS 300 and may be implemented by the backup power manager 110 of FIG. 2. The example UPS 300 may be a UPS of a data center that is to power the load bank 130 of FIG. 1. In FIG. 3, the UPS 310 controls and uses a plurality of battery packs 320 to provide power to the load bank 130.

In the illustrated example of FIG. 3, the UPS controller 310 and further the backup power manager 110 may have access or an ability to monitor the charge status of the battery packs 320. Further, the UPS controller 310 may control or connect the battery packs 320 using a switching fabric 330 such that a set of the plurality of battery packs may be connected in series or in parallel to provide an adequate amount of power to the load bank 130. Accordingly, the backup power manager 110 of FIG. 3 may identify the charge states of each of the battery packs 120 and connect the battery packs 320 (e.g., using a power distributor 240 of FIG. 2) to provide an estimated amount of power to the load bank 130.

As an example, assume that the backup power manager 110 determines that the load bank 130 needs 12 kilowatt hours (kWh) of power. In the illustrated example of FIG. 3, the SOCs of the battery packs 320 indicating a remaining amount of power of the battery packs 320 are shown in parenthesis of the respective battery packs 320. Accordingly, the backup power manager 110 of FIG. 3 may select the battery packs 321, 322, 325 to discharge to provide backup power to the load bank 130. In this is example, the strongest battery packs are selected to provide backup power. Further, the backup power manager 110 may have selected the battery packs 321, 323, 325 over the battery pack 328 because the battery pack 328 was the most recently discharged of the strongest battery packs 321, 323, 325, 328. In another example, the backup power manager 110 may select the batter packs that would provide just enough (or the minimum amount) of power needed to provide backup power to the load bank 130. For example, the backup power manager 110 may select the battery packs 321, 324, 325 to provide backup power to the load bank 130. Thus, the backup power manager 110 may select and connect any of the battery packs 320 in series or parallel based on settings and priorities (e.g., received via user input) using the switching fabric 330 to provide the appropriate amount of power to the load bank 130. Additionally or alternatively, the backup power manager 110 may consider a percentage (%) of battery power remaining in the battery packs 320 when selecting the battery packs. For example, the backup power manager 110 may select the battery packs that have the highest percentage of power remaining.

In some examples, the UPS 300 may be used to implement each of the backup power sources 120 of FIG. 1. Accordingly, in such an example, a backup power manager 110 may be included within each of the backup power sources 120 of FIG. 1, which may communicate with the backup power manager 110 of FIG. 1 (e.g., provide status information, charge status of the battery packs 320, time of last discharge or discharge history, etc.).

Figure 4:
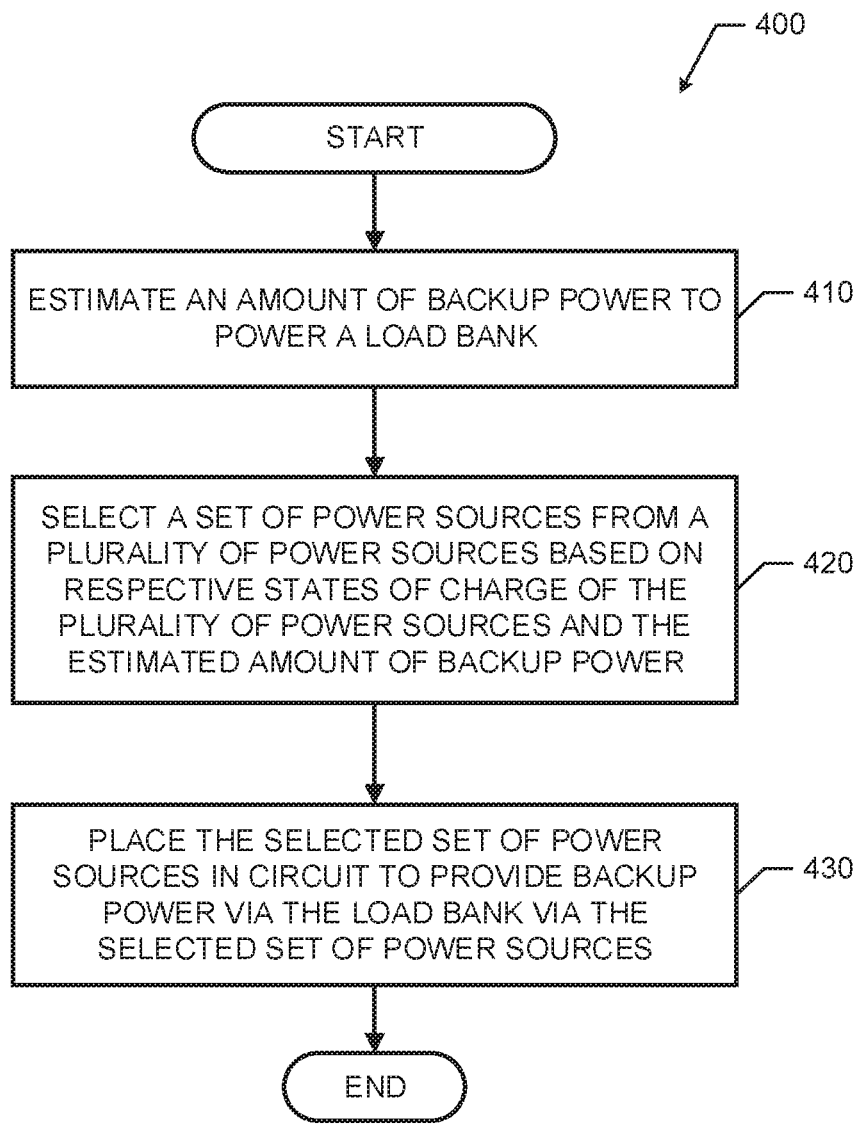
FIG. 4 is a flowchart representative of example machine readable instructions that may be executed to implement the backup power manager of FIG. 2.
Figure 5:
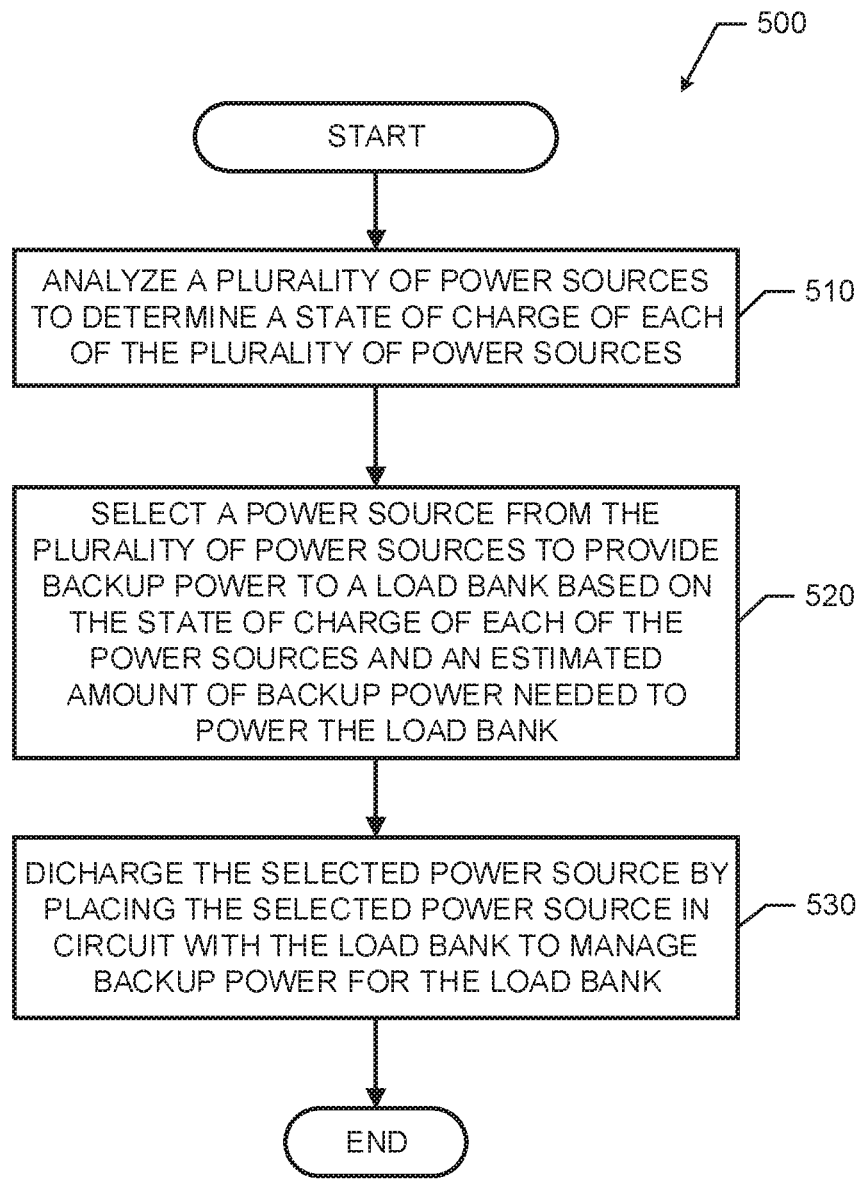
FIG. 5 is another flowchart representative of example machine readable instructions that may be executed to implement the backup power manager of FIG. 2.

Flowcharts representative of example machine readable instructions for implementing the backup power manager 110 of FIG. 2 are shown in FIGS. 4 and 5. In this example, the machine readable instructions comprise program(s)/process(es) for execution by a processor such as the processor 612 shown in the example processor platform 600 discussed below in connection with FIG. 6. The program(s)/process(es) may be embodied in executable instructions (e.g., software) stored on a tangible machine readable storage medium such as a CD-ROM, a floppy disk, a hard drive, a digital versatile disk (DVD), a Blu-ray disk, or a memory associated with the processor 612, but the entire program/process or parts thereof could alternatively be executed by a device other than the processor 612 or embodied in firmware or dedicated hardware. Further, although the example program(s)/process(es) is/are described with reference to the flowcharts illustrated in FIG. 4 or 5, many other methods of implementing the example backup power manager 110 may alternatively be used. For example, the order of execution of the blocks may be changed, or some of the blocks described may be changed, eliminated, or combined.

The example process 400 of FIG. 4 begins with an initiation of the backup power manager 110 (e.g., upon startup, upon instructions from a user, upon startup of a device implementing the backup power manager 110 (e.g., a UPS, the power system 100), etc.). The example process 400 of FIG. 4 may be executed to manage backup power of a power system (e.g., the power system 100) and provide power to a load bank (e.g., the load bank 130) in the event of a line power failure (e.g., a failure or disconnection of the line power supply 140). At block 410, the backup power estimator 220 estimates an amount of backup power to sufficiently power the load bank 130. For example, at block 410, the backup power estimator 220 may analyze past power consumption of the load bank 130. For example, the past power consumption may indicate an average or maximum power consumption by the load bank 130 during a time period relative to the power failure (e.g., a past time of the day, week, month, year, etc. corresponding to the time of the power failure), during a most recent time period prior to the power failure (e.g., during a most recent hour, day, week, etc.), or the power consumption at or near the time of the power failure, etc.

At block 420, the power source selector 230 selects a set of power sources from a plurality of power sources based on respective states of charge of the plurality of power sources and the estimated amount of backup power. For example, at block 420, the power source selector 230 may identify the estimated amount of backup power to power the load bank 130 and select power sources from the plurality of power sources that have a strongest state of charge (e.g., based on remaining power or percentage of power available), such that a sum of the state of charge is enough to satisfy or provide the amount of backup power. In some examples at block 420, the power source selector 230 may consider a most recent discharge time or discharge history of the plurality of power sources when selecting the set of power sources 120. At block 430, the power distributor 420 places the selected set of power sources 120 in circuit to provide backup power to the load bank via the selected set of power sources 120. After block 430, the example process 400 ends. In some examples, the backup power manager 110 may be implemented by iteratively executing the process 400 to add or remove power sources 120 while providing backup power to account for changes in the estimated amount of power needed to power the load bank 130, exhaustion of a selected power source 120, etc. Further, the iterative execution of the example process 400 may end upon restoration of power from the line power supply 140.

The example process 500 of FIG. 5 begins with an initiation of the backup power manager 110. The example process 500 of FIG. 5 may be executed additionally or alternatively to the example process 400 of FIG. 4 to manage backup power of a power system (e.g., the power system 100) and provide power to a load bank (e.g., the load bank 130) in the event of a line power failure (e.g., a failure or disconnection of the line power supply 140). At block 510, the backup source analyzer 210 analyzes a plurality of power sources 120 to determine a state of charge of each of the plurality of power sources 120. For example, the backup source analyzer 210 may analyze received/retrieved status information from the power sources 120 that indicates states of charge of each of the power sources 120 or of battery packs of each of the power sources 120.

At block 520 of FIG. 5, the power source selector 230 selects a power source to provide backup power to a load bank based on the state of charge of the power sources and an estimated amount of backup power needed to power the load bank. In some examples at block 520, the power source selector 230 may consider a most recent discharge time or discharge history of the plurality of power sources when selecting the set of power sources 120. At block 530, the power distributor 240 discharges the selected power source by placing the selected power source in circuit with the load bank to manage backup power for the load bank. After block 530, the example process 500 ends. In some examples, the backup power manager 110 may be implemented by iteratively executing the process 500 to add or remove power sources 120 while providing backup power to account for changes in the estimated amount of power needed to power the load bank 130, exhaustion of a selected power source 120, etc. Further, the iterative execution of the example process 500 may end once a power failure or disconnection is resolved (e.g., upon restoration of power from the line power supply 140).

As mentioned above, the example processes of FIG. 4 or 5 may be implemented using coded instructions (e.g., computer or machine readable instructions) stored on a tangible machine readable storage medium such as a hard disk drive, a flash memory, a read-only memory (ROM), a compact disk (CD), a digital versatile disk (DVD), a cache, a random-access memory (RAM) or any other storage device or storage disk in which information is stored for any duration (e.g., for extended time periods, permanently, for brief instances, for temporarily buffering, or for caching of the information). As used herein, the term tangible machine readable storage medium is expressly defined to include any type of machine readable storage device or storage disk and to exclude propagating signals and to exclude transmission media. As used herein, "computer readable storage medium" and "machine readable storage medium" are used interchangeably. Additionally or alternatively, the example processes of FIG. 4 or 5 may be implemented using coded instructions (e.g., computer or machine readable instructions) stored on a non-transitory computer or machine readable medium such as a hard disk drive, a flash memory, a read-only memory, a compact disk, a digital versatile disk, a cache, a random-access memory or any other storage device or storage disk in which information is stored for any duration (e.g., for extended time periods, permanently, for brief instances, for temporarily buffering, or for caching of the information). As used herein, the term non-transitory machine readable medium is expressly defined to include any type of machine readable storage device or storage disk and to exclude propagating signals and to exclude transmission media.

As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 6:
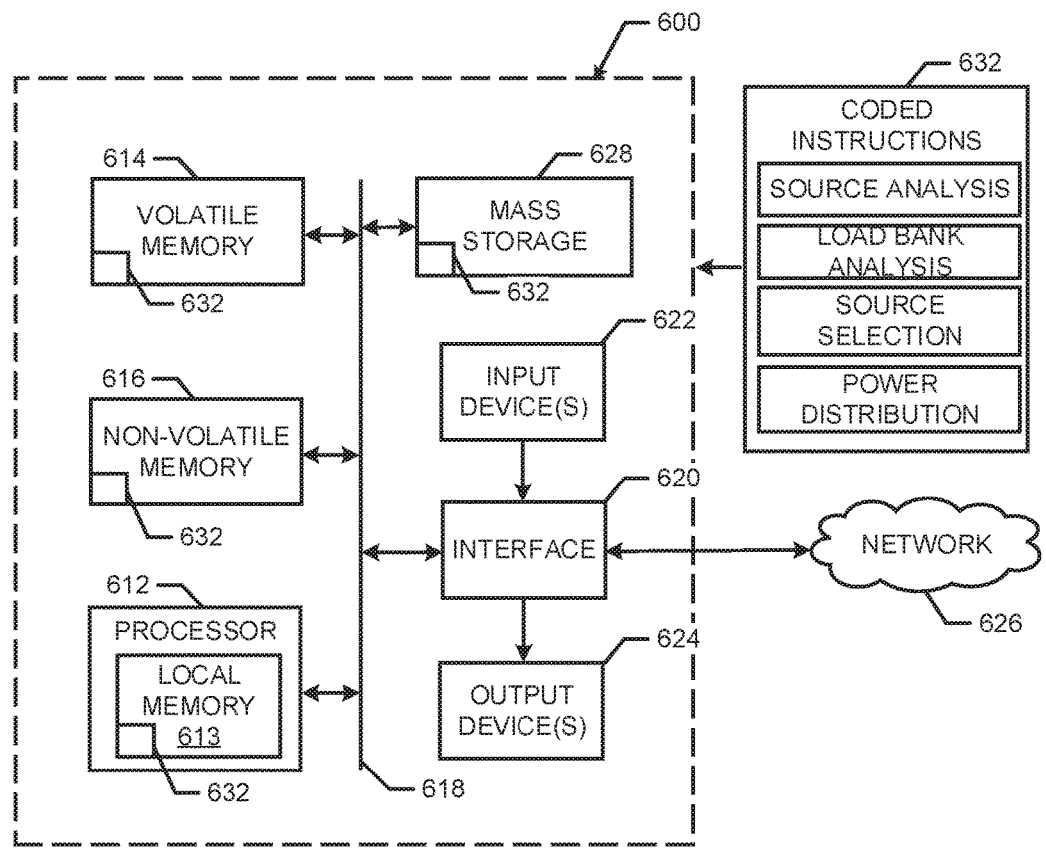
FIG. 6 is a block diagram of an example processor platform capable of executing the instructions of FIG. 4 or 5 to implement the backup power manager of FIG. 2.

FIG. 6 is a block diagram of an example processor platform 600 capable of executing the instructions of FIGS. 4 and 5 to implement the backup power manager 110 of FIG. 2. The example processor platform 600 may be or may be included in any type of apparatus, such as a server, a personal computer, any other type of computing device.

The processor platform 600 of the illustrated example of FIG. 6 includes a processor 612. The processor 612 of the illustrated example is hardware. For example, the processor 612 can be implemented by at least one integrated circuit, logic circuit, microprocessor or controller from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618, The volatile memory 614 may be implemented by Synchronous Dynamic Random Access Memory (SDRAM), Dynamic Random Access Memory (DRAM), RAMBUS Dynamic Random Access Memory (RDRAM) or any other type of random access memory device. The non-volatile memory 616 may be implemented by flash memory, a persistent, byte-addressable memory accessible via a memory fabric or any other desired type of non-volatile memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), or a peripheral component interconnect (PCI) express interface.

In the illustrated example, at least one input device 622 is connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, or a voice recognition system.

At least one output device 624 is also connected to the interface circuit 620 of the illustrated example. The output device(s) 624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer or speakers). The interface circuit 620 of the illustrated example, thus, may include a graphics driver card, a graphics driver chip or a graphics driver processor.

The interface circuit 620 of the illustrated example also includes a communication device such as a transmitter, a receiver, a transceiver, a modem or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes at least one mass storage device 628 for storing executable instructions (e.g., software) or data. Examples of such mass storage device(s) 628 include floppy disk drives, hard drive disks, compact disk drives, Blu-ray disk drives, RAID systems, and digital versatile disk (DVD) drives.

The coded instructions 632 of FIGS. 4 and 5 to implement the backup power manager 110 may be stored in the mass storage device 628, in the local memory 613 in the volatile memory 614, in the non-volatile memory 616, or on a removable tangible machine readable storage medium such as a CD or DVD.

From the foregoing, it will be appreciated that the above disclosed methods, apparatus and articles of manufacture provide a backup power manager to select power sources to power a load bank based on states of the power sources and an estimated amount of power needed. Accordingly, in examples herein, only a portion of the available power resources may be used to provide backup power to the load bank. The power sources may be selected in order to extend the use or life of the battery and further lessen costs of maintaining and providing backup power to a load bank of a system (e.g., a data center). In other words, power sources may be adaptively selected based on needs of the load bank, rather than discharging or utilizing all available power sources to provide backup power to the load bank.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to manage backup power, the method comprising:
   estimating an amount of backup power to power a load bank;
   selecting a set of power sources from a plurality of power sources based on respective states of charge of the plurality of power sources and the estimated amount of backup power;
   analyzing a power consumption history of the load bank to estimate a minimum amount of power required to power the load bank, the minimum amount of power corresponding to the amount of backup power; and
   placing the selected set of power sources in circuit to provide backup power to the load bank via the selected set of power sources.

2. The method as defined in claim 1, wherein each of the plurality of power sources comprise a battery pack.

3. The method as defined in claim 1, further comprising selecting the set of power sources from the plurality of power sources that have the strongest state of charge, the sum of the states of charge of the power sources of the selected set of power sources being greater than or equal to the amount of backup power to power the load bank and less than the sum of the states of charge of the power sources of the plurality of the power sources.

4. The method as defined in claim 1, further comprising analyzing status information of each of the plurality of power sources capable of supplying backup power to the load bank, the status information indicating the state of charge of the respective power sources.

5. The method as defined in claim 4, the status information of each of the plurality of power sources further indicating a most recent discharge of the respective plurality of power sources, the method further comprising: selecting the set of power sources based on the most recent discharges of the respective power sources.

6. The method as defined in claim 1, further comprising:
  detecting a power failure or disconnection in a line power supply powering the load bank.

7. The method as defined in claim 1, further comprising:
  placing the selected set of power sources in circuit by connecting each of the power sources of the set of power sources in series or parallel using a switching fabric to provide at least the estimated amount of backup power to the load bank.

8. A non-transitory machine readable storage medium comprising instructions that, when executed, cause a machine to at least:
  analyze a plurality of power sources to determine a state of charge of each of the plurality of power sources;
  estimate a minimum amount of backup power to sufficiently power a load bank;
  select a power source from the plurality of power sources to provide backup power to the load bank based on the state of charge of each of the power sources and an estimated amount of backup power needed to power the load bank; and
  discharge the selected power source by placing the selected power source in circuit with the load bank to manage backup power for the load bank.

9. The non-transitory machine readable storage medium of claim 8, wherein the instructions, when executed, further cause the machine to:
  determine a most recent discharge time of each of the plurality of power sources; and
  select the power source based on the most recent discharge time of each of the plurality of power sources.

10. The non-transitory machine readable storage medium of claim 8, wherein the instructions, when executed, further cause the machine to:
  place the selected power source in circuit with a component of the load bank that is critical to maintain power without placing the selected power source in circuit with a component of the load bank that is not critical to maintain power.

11. An apparatus comprising:
  a backup source analyzer to analyze status information of a plurality of backup power sources;
  a backup power estimator to estimate a minimum amount of backup power to sufficiently power a load bank;
  a source selector to, in response to detecting a line power failure, select a set of backup power sources to supply backup power to the load bank based on the status information of the plurality of backup power sources and the estimated backup power to power the load bank; and
  a power distributor to supply backup power to the load bank via the selected set of backup power sources.

12. The apparatus of claim 11, wherein the source selector is to:
  upon restoration of the line power, select a backup power source from the plurality of backup power sources to be charged, the backup power source comprising a least charged power source of the plurality of backup power sources; and
  enable charging of the selected backup power source.

13. The apparatus of claim 11, wherein the amount of power provided by the set of backup power sources is greater than the amount of backup power and less than the amount of power capable of being discharged by the plurality of power sources.

\* \* \* \* \*